INVENTOR.
STANLEY E. KRUEGER
BY
Darby v Darby
ATTORNEYS

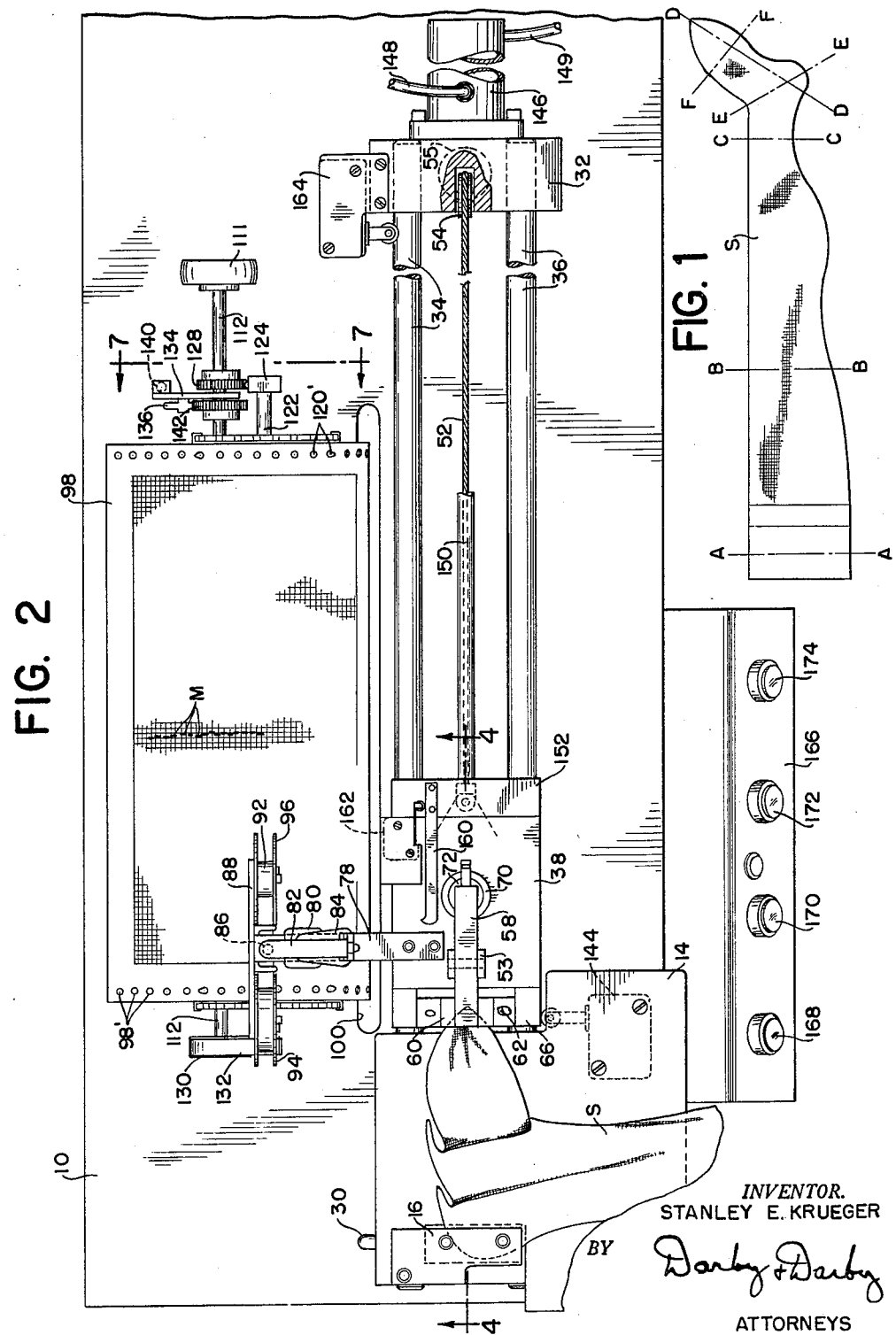

July 30, 1963 S. E. KRUEGER 3,099,152
STOCKING STRETCH MEASURING MACHINE
Filed March 1, 1961 5 Sheets-Sheet 3
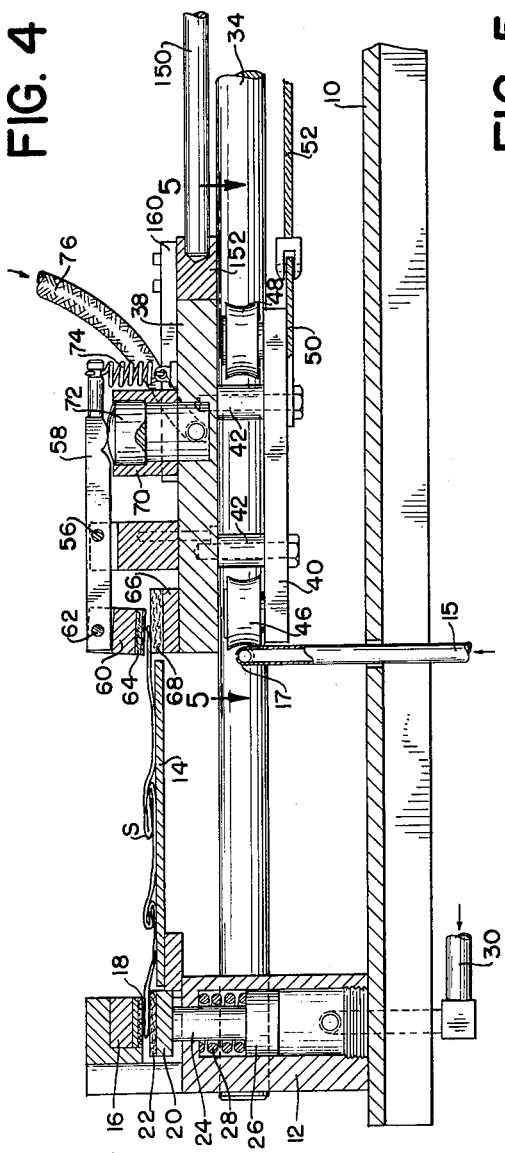
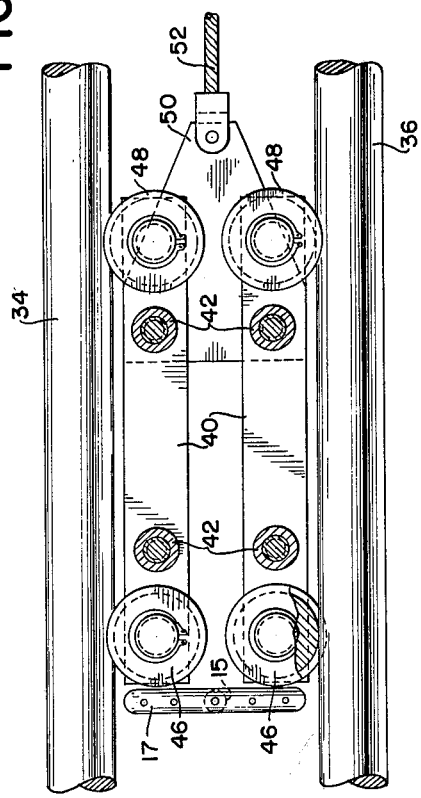
INVENTOR.
STANLEY E. KRUEGER
BY Darby & Darby
ATTORNEYS

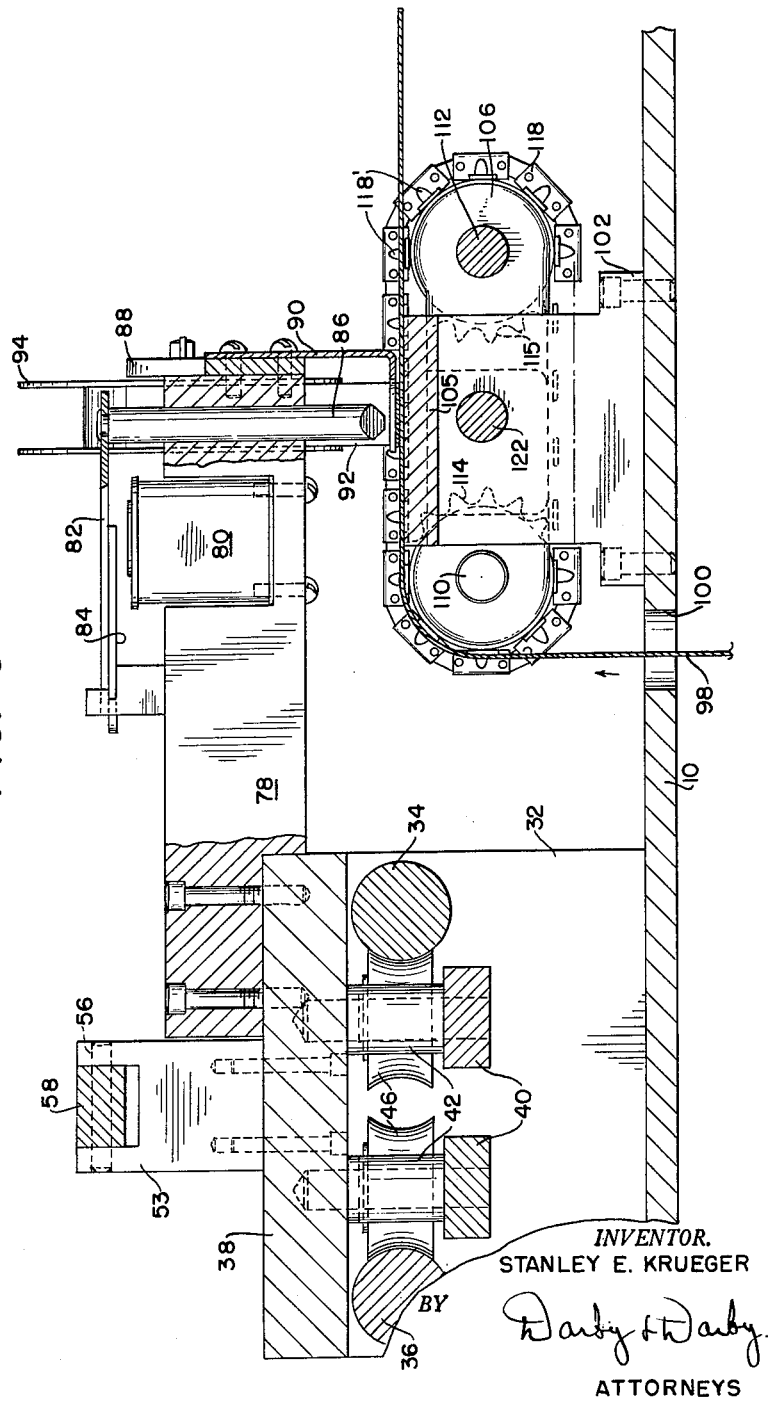

July 30, 1963   S. E. KRUEGER   3,099,152
STOCKING STRETCH MEASURING MACHINE
Filed March 1, 1961   5 Sheets-Sheet 5

110V-60c

INVENTOR.
STANLEY E. KRUEGER
BY Darby & Darby
ATTORNEYS

United States Patent Office 3,099,152
Patented July 30, 1963

3,099,152
STOCKING STRETCH MEASURING MACHINE
Stanley E. Krueger, Grenada, Miss., assignor, by mesne assignments, to U.S. Industries, Inc., New York, N.Y., a corporation of Delaware
Filed Mar. 1, 1961, Ser. No. 92,669
4 Claims. (Cl. 73—95)

This invention involves a machine for indicating and recording the amount of stretch in a knitted fabric such as for example full fashioned and no seam nylon hosiery.

The general object of the invention is to provide a machine by means of which the test characteristics of knit stretchable fabric can be determined under uniform and comparative conditions as a substitute for the presently used less accurate machines, as well as the hand method which is sometimes used.

Additional objects both broad and narrow will be apparent from the following description of the embodiment of the machine selected for the purpose of illustrating the nature and scope of this invention.

The selected embodiment is illustrated in full detail in the accompanying drawings.

In the drawings,

FIGURE 1 is a diagrammatic illustration of a stretch fabric specifically ladies' hosiery;

FIGURE 2 is a top plan view of the machine of this invention with some parts broken away to permit inclusion of the full assembly in a single figure and to better illustrate the structure;

FIGURE 4 is a cross-sectional view taken on the line 4—4 of FIG. 2;

FIGURE 5 is a cross-sectional view taken on the line 5—5 of FIG. 4;

FIGURE 6 is a cross-sectional view taken on the line 6—6 of FIG. 3;

Figure 3:
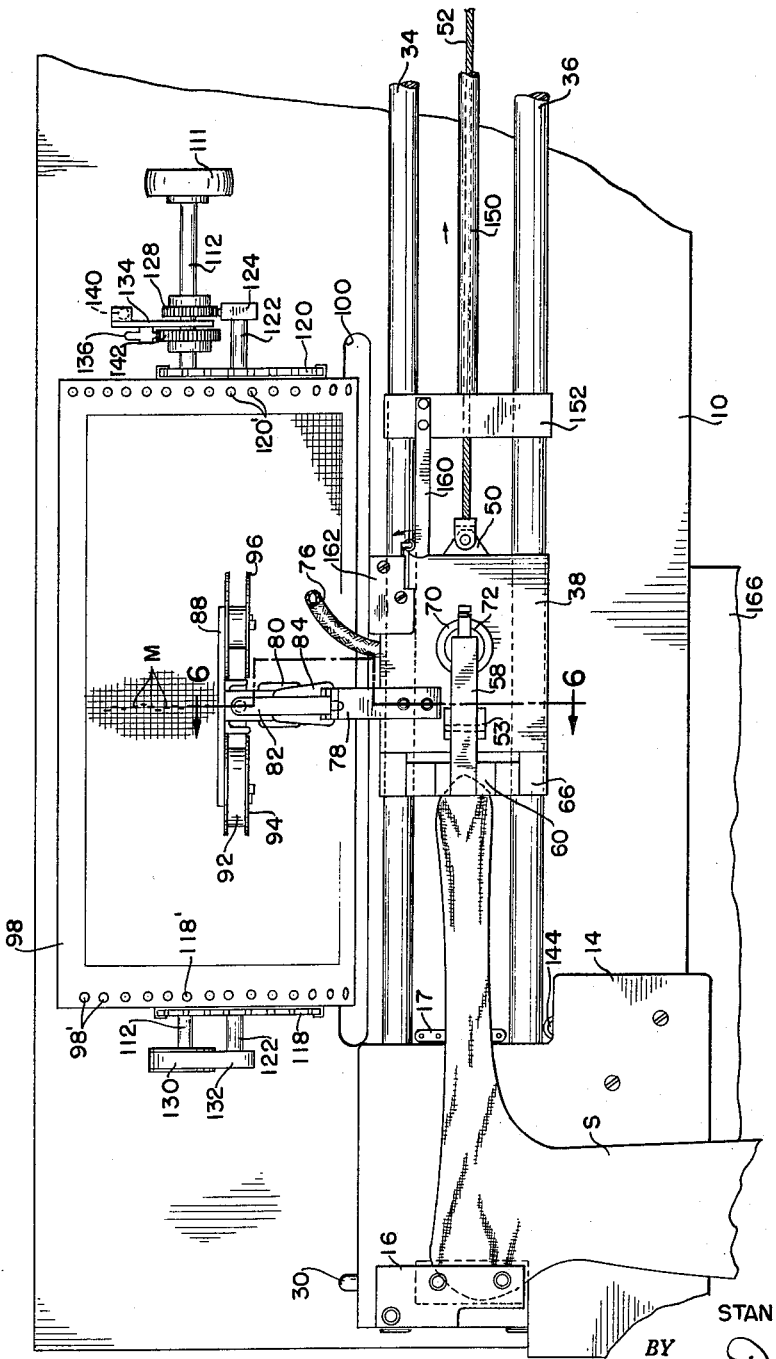
FIGURE 3 is a plan view to illustrate the major portion of the mechanism of FIG. 2 with additional parts broken away and showing the machine in the act of testing the stretch characteristics of the foot of ladies' hosiery.

As is well understood in the manufacture of stretch nylon fabric such as for example ladies' full fashioned and no seam nylon hosiery, special attention is given to the characteristics of elasticity or stretch which the fabric possesses as this is a most important factor in determining the fitting characteristics of the stocking. Through trial and error the fabric manufacturer determines the amount of stretch necessary to produce a proper fitting garment and then establishes knitting specifications and stretch standards to insure continued production of properly fitting garments.

In the case of stretch hosiery stretch measurements made to the nearest ⅛" are obtained for different areas of the hose, such as the areas along the lines A—A, B—B, C—C, D—D, E—E and F—F, see FIG. 1. These regions of stretch, as will be recognized by those skilled in the art, correspond to the welt, the leg, the ankle, the instep, the sole and the foot.

At the present time stretch measurements are made by various devices available for the purpose, as well as manually. For one reason or another the present machines and methods are not completely satisfactory due in part to inconsistencies in the results obtained, carelessness on the part of the operators or inadvertent errors even in the case of careful operators.

Since the stretch measurements thus obtained are used as guides for making adjustments in the knitting machines to maintain continued manufacture of properly fitted hosiery for example, it is essential that the operator record the exact measurements produced by the stretching machine. Furthermore, that these measurements be repeated time and again under comparable conditions. Where errors creep in in these measurements, readjustments of the knitting machinery may result, thereby producing even less desirable fabric.

The general object of this invention is to provide a machine which can uniformly and rapidly subject knitted fabrics such as ladies' hosiery to the same test conditions and record the results of those tests in conveniently useful form. Most important of all is that the recorded test results be uniformly accurate and comparable to insure the development and maintenance of accurate knitting specifications.

As illustrated in the accompanying drawings, the machine includes a table or base 10 which can be supported at the proper height on any suitable substructure, not shown. Mounted at the lefthand end of the table is a work surface 14 which is supported on a standard 12 attached to the top of table 10, see FIGS. 2 and 4. Mounted on the standard 12 is a fixed anvil 16 having a gripping surface 18 forming one jaw of a fabric clamp. Mounted under this jaw for vertical reciprocation is a pressure foot 20 likewise having a friction surfacing 22 to provide the other jaw of what as a unit can be called a fixed fabric clamp. The pressure shoe 20 is mounted on a piston rod 24, which in turn is connected to a piston 26 reciprocal vertically in a cylinder formed in the standard 12, all as clearly shown in FIG. 4. A compression spring 28 is interposed between the piston 26 and the end of the cylinder cavity so as to clearly urge the pressure shoe 20 away from the fixed clamping member 16. A fluid pressure supply pipe 30 is in communication with the cylinder below the piston 26.

Extending between the standard 12 and aligned standard 32 spaced to the right thereof, see FIG. 2, are a pair of parallel rails in the form of rods 34 and 36. Reciprocally mounted on these rails is a carriage comprising a top plate 38, a pair of bars 40, see FIG. 5, supported from the lower surface of the plate 38 by a series of spacing collars 42, these parts being secured together by bolts as shown. Rotatably supported on the ends of the bars 40 are the pairs of vertically grooved rollers 46 and 48 which serve to mount the carriage for longitudinal movement on the rails. A fixture 50 is secured on the end faces of the bars 40 to provide a point of attachment for the cable 52 to the carriage. As will be seen from FIG. 2, this cable passes over a free running pulley 54 journaled in a recess in the standard 32 and is connected at its other end to a free hanging weight 55 which can move up and down in a vertical plane below the rails.

Mounted on top of the plate 38 is a standard 53 which in turn pivotally supports at 56 a lever 58 intermediate its ends. A clamping member 60 is pivotally mounted at 62 on one end of the lever 58 and is provided with a friction pad 64. Mounted on the plate 38 below the clamping member 60 is another clamping member 66 which is also provided with a friction producing surfacing 68. The clamp 60—66 can be referred to as a unit as the movable clamp. Supported on plate 38 towards the other end of lever 58 is a small air cylinder 70 in which a piston 72 can reciprocate. The upper end of the piston and the aligned end of the lever 58 are shaped to form smooth cooperating camming surfaces, as clearly illustrated in FIG. 4. A coiled tension spring 74 connects one end of the lever 58 with the plate 58. A flexible air supply hose 76 is in communication with the lower end of the cylinder in which the piston 72 operates.

As shown in FIGS. 3 and 6 a rearwardly extending arm 78 is mounted on top of the plate 38 and has mounted in a recess formed therein an electromagnet 80. This electromagnet reacts upon a flexible arm 82 which in turn rests upon and is connected to a magnetizable armature 84 supported on the arm 78. The members 82 and 84 form a cantilever system on the outer end of which is mounted a marking finger 86, which will be referred to later.

Mounted on the end of the arm 78 is an L-shaped finger 90 which extends under the arm 78 and forms a guide around which a printing ribbon such as a typewriter ribbon 92 can pass. The foot of the member 90 is slotted, as shown, so that the marking finger 86 may pass downwardly into contact with the ribbon 92 for a purpose to be described later. Mounted on a bracket 88 secured to the end of the arm 78 are a pair of typewriter ribbon spools 94 and 96. The typewriter ribbon 92 can be fed as required from spool 94, for example, onto spool 96 so as to feed freshly inked ribbon to the marking finger as required, and as will be explained later.

The marking finger is used to make stretch indicating marks on suitable graph paper in the form of a long strip 98 which can be stacked in accordion style below the table 10 and fed upwardly through the slot 100 in the table. The paper strip is preferably of the type that is subdivided into sheets of suitable size connected by perforated tear lines so that those sheets can be disconnected from the strip as required. Extending along the sides of the paper strip are a series of perforations 98' supplied for the purpose of feeding the paper strip as required.

Figure 7:
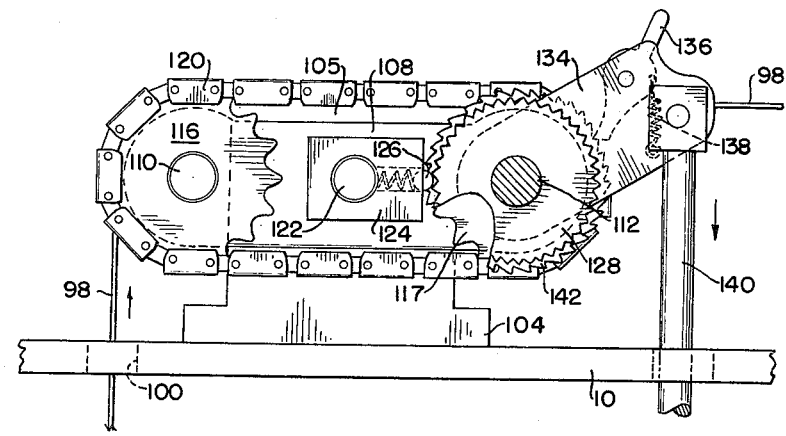
FIGURE 7 is a cross-sectional view taken on the line 7—7 of FIG. 2.

This feeding mechanism is shown particularly in FIGS. 6 and 7 and includes a pair of standards 102 and 104 mounted on the table in spaced relation. The standard 102 is at the left in FIG. 3, for example, and is thus exposed by the section of the line 6—6. The standard 104 is at the righthand end of FIG. 3 and hence appears in FIG. 7, which was taken on the line 7—7 of FIG. 2. Mounted on these standards respectively on the inner faces thereof are a pair of arms 106 and 108 which extend forwardly and rearwardly of the assembly. A table 105 extends between them longitudinally of the assembly so that the paper strip 98 is fed across the top thereof, as clearly shown in FIG. 6. Extending between the arms 106 and 108 are a pair of parallel rotatable shafts 110 and 112. Secured to the shaft 110 at each side of the assembly are the idler sprockets 114 and 116 still looking at FIGS. 6 and 7. A pair of endless chains 118 and 120, see FIGS. 3, 6 and 7 which engage the sprockets 114 and 116 respectively and pass around the drive sprockets 115 and 117 are aligned with said sprockets on the shaft 110.

The chains 118 and 120, as illustrated in the case of chain 118 at 118', are provided with pins which can register with the rows of holes 98' in the paper strip 98. A fixed non-rotatable shaft 122 extends between the standards 102 and 104 and extends beyond each, as is clear from FIG. 3. Mounted on the righthand end of the shaft is a fixture 124 in which a spring pressed detent pawl 126 is mounted so as to engage the teeth of a toothed wheel 128 mounted on and secured to the shaft 112. Interconnecting the other end of the shaft 122 with the shaft 112 is a braking device including the brake drum 130 and the brake band 132.

Loosely mounted on the shaft 112, see FIG. 7, is a lever 134 which has a detent 136 pivotally mounted thereon and controlled by a tension spring 138 so as to engage the teeth of the toothed wheel 142 secured to shaft 112. Pivotally connected to the end of lever 134 is a link 140 to be attached to the plunger of a solenoid 176 to be referred to in connection with FIG. 8.

Mounted under the platform 14, see FIG. 2, is a microswitch 144 arranged to be actuated at the proper time by the carriage 38, as will be explained later. Secured on the outer face of the bracket 32 is a double acting air cylinder 146 having the air supply connections 148 and 149 to the respective ends thereof. This engine includes the usual piston which is connected to a piston rod 150 secured at the other end to a pusher bar 152 slidably mounted on the shafts 34 and 36. Mounted on the pusher bar 152 is a finger 160 positioned to actuate at the proper time a microswitch 162 mounted on the carriage 38. Mounted on the standard 32 is another microswitch 164 positioned to be actuated by the pusher bar 152 at certain times, as will be explained hereinafter.

Mounted on the front side of the table 10, see FIG. 2, is a control board 166 on which are mounted the switches 168, 170, 172 and 174.

Figure 8:
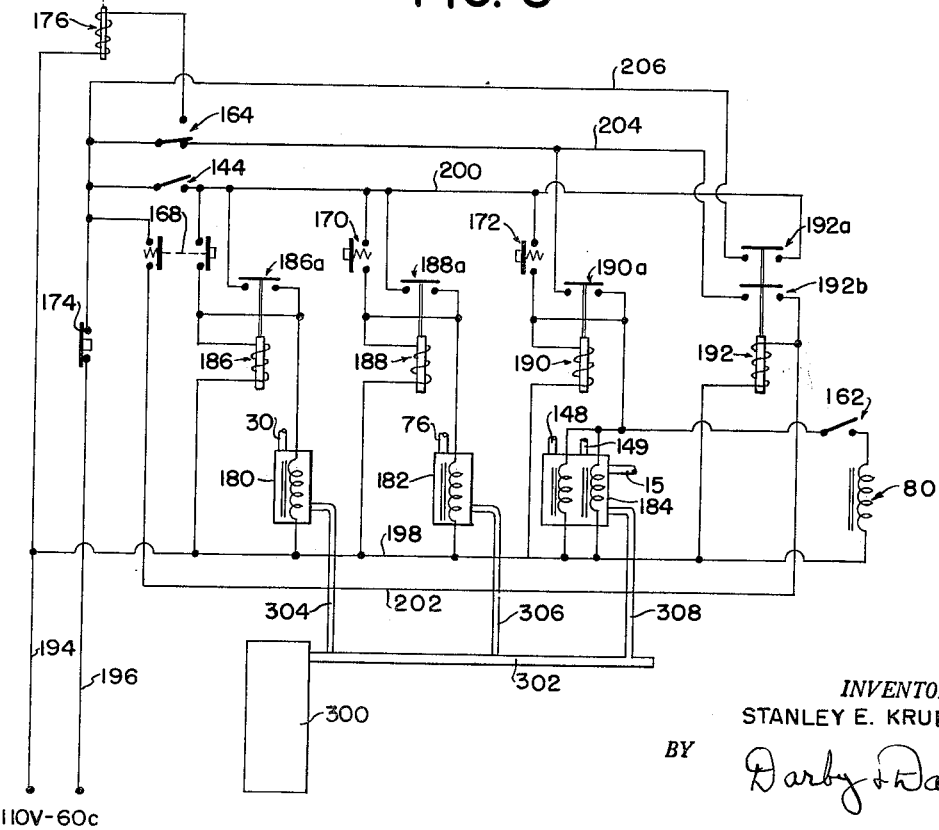
FIGURE 8 is a diagrammatic and schematic illustration of the electrical and air circuits forming part of the machine.

The mechanical and electrical connections which weld these parts into an operative combination are diagrammatically illustrated in FIG. 8. Current from any suitable source is supplied to the circuit through the circuit wires 194 and 196. Wire 194 is connected in series with a solenoid 176 which actuates the lever 134 and one of the contacts of the single-pole double-throw switch 164 previously referred to. Wire 194 is also connected by wire 198 to one terminal of each of the actuating windings, namely 180, 182, 184 of electromagnetically operated air valves. Wire 198 is also connected to one terminal of the pen arm actuating magnet 80. The other terminal of the electromagnet 80 is connected through the switch 162 previously referred to to the other side of the winding 184. The other terminal of winding 180 is connected to one of the contacts of the relay switch 186ª.

One terminal of the operating solenoid 186 for this switch is connected to the wire 198 and the other terminal is connected in series with a pair of contacts of the normally open double-pole switch 168. The other contact of each pair is connected by the wire 200 to the wire 196 through the normally closed switch 144. The other terminal of the winding 182 is connected to one terminal of the single-pole switch 188ª. The other terminal of both switches 186ª and 188ª is connected to the wire 200. The solenoid 188 for the switch 188ª has one terminal connected to the wire 198 and the other terminal connectible to the wire 200 through the single-pole normally open switch 170. The other terminal of the solenoid 184 is connected to one terminal of the single-pole switch 190ª, the other terminal of which is connected to wire 204. One terminal of solenoid 190 for operating the switch 190ª is connected to the wire 198 and the other terminal is connectible through a normally open switch 172 to the wire 200.

One terminal of a solenoid 192 is connected to the wire 198 and the other terminal is connected by wire 202 to main circuit wire 196 through the other contacts of the normally open double-pole switch 168. Wire 202 is also connectible to wire 204 through one pair of terminals of the double-pole switch 192ª actuated by the solenoid 192. Wire 204 is normally connected to a pair of contacts through the other pair of contacts of the single-pole, double-throw switch 164 to the main circuit wire 196. Wire 200 is connectible through the other pair of contacts of switch 92ª to wire 206 which is connected to the main circuit wire 196. This main circuit wire includes a normally closed single-pole switch 174.

Each of the electromagnetically operated air valves 180, 182 and 184 is connected by the pipes 304, 306 and 308 respectively to an air supply conduit 302, which extends from the pressure fluid source 300. The air valve of the electromagnetically operated valve 184 is of the four-way type and is provided with two pressure fluid supply lines 148 and 149 which connect to the respective ends of the air cylinder 146, see FIG. 2. This valve has two windings 184 which are simultaneously energized and de-energized as will be explained. Each actuates a valve so that on energization air is supplied to the engine 146 through line 149 and exhausted through line 148. When the windings 184 are de-energized air is supplied to engine 146 through line 148 and exhausted through line 149. The exhaust from either line is supplied to nozzle 17, see FIG. 1, through line 15. The ports in the four way valve 184 to which the lines 148 and 149 are connected are adjustable to form metering devices to control the rate of supply and exhaust of air to and from the engine 146 for a purpose to be described. The valve 184 is a standard commercial valve readily available from various suppliers.

The operation of the device will now be described. When the windings 184 of the four-way electromagnetically operated valve of which it is a part are de-energized, the valving is such that air is supplied from the source 300 through the conduit 302, branch 308, the valve itself, and connection 149 so that air is supplied to the righthand end of the cylinder 146. At the same time the other end of the cylinder is connected to exhaust through the line 148 and the valve to and through the nozzle 17 by way of pipe 15. The result is that the piston of the cylinder 146 is moved to the left, FIG. 2, which acting through the piston rod 150 and the pusher 152 forces the carriage 38 of the chain to the left, that is the position shown in FIG. 2. This movement of the parts is at a controlled rate in view of the restricted supply and exhaust of air to the righthand end and from the lefthand end of cylinder 146 through the controlled ports of valve 184. Thus the machine is ready to receive a stocking to be tested and the clamps 16—20 and 60—66 are open, as shown in FIG. 4.

Assuming that the stretch of the foot of the stocking is to be recorded, the heel is placed in the fixed clamp 16—20, see FIGS. 2 and 4, and the toe is placed in the clamp 60—66. The operator then closes switches 168 and 170.

The closing of switch 168 causes current to flow from wire 196 through switch 174, the lefthand contacts of switch 168, wire 202, winding 192 and back through return 198 to supply circuit wire 194. This causes switches 192a and 192b to close setting up a holding circuit for winding 192 through the closed switch 164 and line 204. Current also flows from line 196 through line 206, contacts 192a, line 200, the righthand pair of contacts of switch 168 to winding 186 and then back to supply line 194. Switch 186a is closed completing a circuit for the winding 180. This causes switch 186a to close, which completes a holding circuit for the winding 186 through the jumper shown and for the winding 180. Energization of the winding 180 operates the valve associated with it and supplies air through the branch 304 to the pipe 30 which is connected to the fixed clamp, see FIG. 4.

In a similar way the closing of switch 170 causes air to be supplied through the pipe 76 to close the movable clamp, all as will be obvious from FIG. 8. As a part of this the switch 188a is closed and the holding circuit for the magnet 188 is completed. Thus both clamps close on the ends of the foot to hold them tightly.

The operator momentarily closes switch 172 which supplies current from circuit wire 196 through normally closed switch 174, through wire 206, through upper contacts switch 192a, through wire 200, to and through the solenoid winding 190 back to the other circuit wire 194 through the wire 198. Here again a holding circuit is set up for the now energized magnet valve winding 184 through the jumper shown. The actuation of the valve upon energization of the magnet 184 supplies air through the branch 308 and the valve to branch 148 and hence to the lefthand side of the cylinder 146. At the same time the righthand side of the cylinder is connected to exhaust through the line 149, the restricted port to which it is connected in valve 184 and nozzle 17 by way of pipe 15. Thus the pusher bar 152 moves slowly to the right, FIG. 2, depending upon the rate of air supply and exhaust. The carriage 38 moves with it under the force of the free hanging weight 55 acting through the cable 52, the weight having been raised when the carriage was moved to its supporting position. As the carriage 38 moves to the right it carries the toe of the stocking S with it and ultimately the toe is stretched out under the action of the weight 55 into an extended form diagrammatically illustrated in FIG. 3. The weight is so selected that the stocking foot is stretched to a desired amount and when the stretch limit is reached the carriage 38 comes to a stop. However, air continues to be supplied to the lefthand end of cylinder 146 and so the pusher bar 152 continues to move to the right, FIG. 3, gradually separating from the stopped carriage.

This separation continues until the finger 160 mounted on the pusher 152 actuates the microswitch 162, which is about to occur, as indicated in FIG. 3. The length of the finger 160 is selected so as to allow time for the foot to be fully stretched. When switch 162 is actuated it completes the circuit for the marking magnet 80 through the closed switch 190a. Energization of the magnet 80 causes the marking finger 86, FIG. 6, to move down into contact with the typewriter ribbon 92 and thereby apply a mark such as one of the marks M, see FIG. 2, to the chart sheet 98. This actuation of the pen is momentary since switch 162 immediately opens when the finger 160 passes by it. The result is that the amount of stretch of the foot has been recorded on the chart, it being designed and proportioned to give an interpretable indication.

The pusher 152 continues to move to the right until switch 164 is actuated from the position shown in FIG. 8 to its other position, whereupon the solenoid 176 is energized in an obvious manner to tip the lever 134. Switch finger 136 mounted thereon being in engagement with the toothed wheel 142 causes shaft 112 to rotate the rest of the paper feed mechanism one step, that is the paper will move upwardly in FIG. 2 a predetermined distance. In addition the operation of switch 164 breaks the holding circuit for the magnet 190 as well as for the winding 184. Thus the valve of which the winding 184 is a part is actuated to its original position. The result is that air is now supplied to the righthand end of cylinder 146 through connection 149 and the lefthand end is exhausted as before through the restricted port. Thus the pusher begins to go to the left traveling thus until it engages the carriage 38, whereupon that carriage is moved by it back to the position shown in FIG. 2. Just as it gets back to starting position it actuates normally closed switch 144, see FIG. 2, to break the circuits for the windings 186 and 188. This results in the de-energization of the windings 180 and 182 of the air valves and they cut off the supply of air from the source to the pipes 30 and 76 so that the clamps open. Obviously, of course, these valves have exhaust ports to permit the springs 28 and 74 to open the clamps. Thus the tested stocking is released and can be replaced with the next stocking to be tested.

At this point it may be noted that the switch 174 which is normally closed is in the nature of a panic button. If anything goes wrong with the operation this switch is opened and all circuits are killed.

It will be noted that the circuit for the magnet 80 through the switch 162 is so arranged that on the return of the pusher back into contact with the carriage the actuation of switch 162 cannot complete the circuit for the marking pen magnet 80 because in the meantime that circuit has been interrupted by switch 190a, even though at this time switch 164 will be back in the position shown in FIG. 8.

Other minor points can be noted such as for example that the handwheel 111, see FIG. 3, can be operated to feed the paper strip 98 to a point where a section can be detached when a desired number of marks M have been made, that is a desired number of stockings have been tested. The detent in the fixture 124 is merely a centering device to accurately position the paper in a desired stopped position. There is shown no mechanism for feeding the typewriter ribbon as a number of marks can be made for each position of the ribbon and when they get too weak the ribbon can be advanced manually. The brake mechanism 130—132 is merely provided so as to insure against any over-running in the feeding of the paper. It acts as a brake on the feed mechanism.

It will be apparent that the novel subject matter of this invention is capable of embodiment in different forms of mechanism subject to considerable variation in the details thereof. It is preferred, therefore, that the embodiment selected for illustrating this subject matter be considered as exemplary and that the scope of the invention therefore be determined by the appended claims.

What is claimed is:

1. In a machine for measuring and recording the stretch in an elastic article in combination, a fixed clamp, a movable clamp including a weight loaded reciprocable carriage support therefor, power operated means including a pusher member for moving said carriage towards said fixed clamp and for moving said pusher member away from said carriage and said fixed clamp and allowing said carriage to recede from said fixed clamp under its weight loading, a chart recorder including a marking device on said carriage, means for controlling the rate of movement of said power operated means, and means actuated by the pusher member for energizing said marking device after the carriage comes to rest with the article stretched by the weight loading thereon and the pusher member has receded from said carriage a predetermined distance.

2. In the combination of claim 1, means actuated by said pusher member at the end of its movement of recession to reverse said power operated means.

3. In the combination of claim 1, means actuated by said pusher member for energizing said chart recorder to fit its chart to a new position.

4. In the combination of claim 1, said fixed and movable clamps being power operated, and means actuated when the carriage returns to its initial position to release said clamps.

References Cited in the file of this patent

UNITED STATES PATENTS

| | | |
|---|---|---|
| 2,390,178 | Rutherford | Dec. 4, 1945 |
| 2,560,135 | Shearer | July 10, 1951 |
| 2,669,867 | Holmes | Feb. 23, 1954 |
| 2,712,755 | Meytre | July 12, 1955 |
| 2,908,163 | McClelland | Oct. 13, 1959 |